G. W. BABCOCK.
APPARATUS FOR PRODUCING STICKS OF COMB HONEY.
APPLICATION FILED MAR. 30, 1918.

1,407,244. Patented Feb. 21, 1922.

Inventor
G. W. Babcock

Witness
J. P. Gomer

By C. A. Snow & Co.
Attorneys.

UNITED STATES PATENT OFFICE.

GEORGE W. BABCOCK, OF ROCHESTER, NEW YORK.

APPARATUS FOR PRODUCING STICKS OF COMB HONEY.

1,407,244. Specification of Letters Patent. Patented Feb. 21, 1922.

Application filed March 30, 1918. Serial No. 225,716.

*To all whom it may concern:*

Be it known that I, George W. Babcock, a citizen of the United States, residing at Rochester, in the county of Monroe and State of New York, have invented a new and useful Apparatus for Producing Sticks of Comb Honey, of which the following is a specification.

This invention relates to apparatus for producing sticks of comb honey and is designed particularly as an improvement upon the apparatus disclosed in Patent No. 1,188,386 issued to me on June 27, 1916.

As disclosed in said patent it has been the practice to produce depressions in the faces of a cake of comb honey by mounting coils or the like in the frame so that the bees will work around these coils and thus produce depressions resulting in the separation of the comb honey into sticks.

One of the objects of the present invention is to dispense with the use of these coils or like devices and to provide movable members which serve to keep the bees out of certain line in the frame with the result that they will build up the comb honey in sticks which can be easily separated simply by severing the comb foundation or midrib.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figures 1, 2, 3:
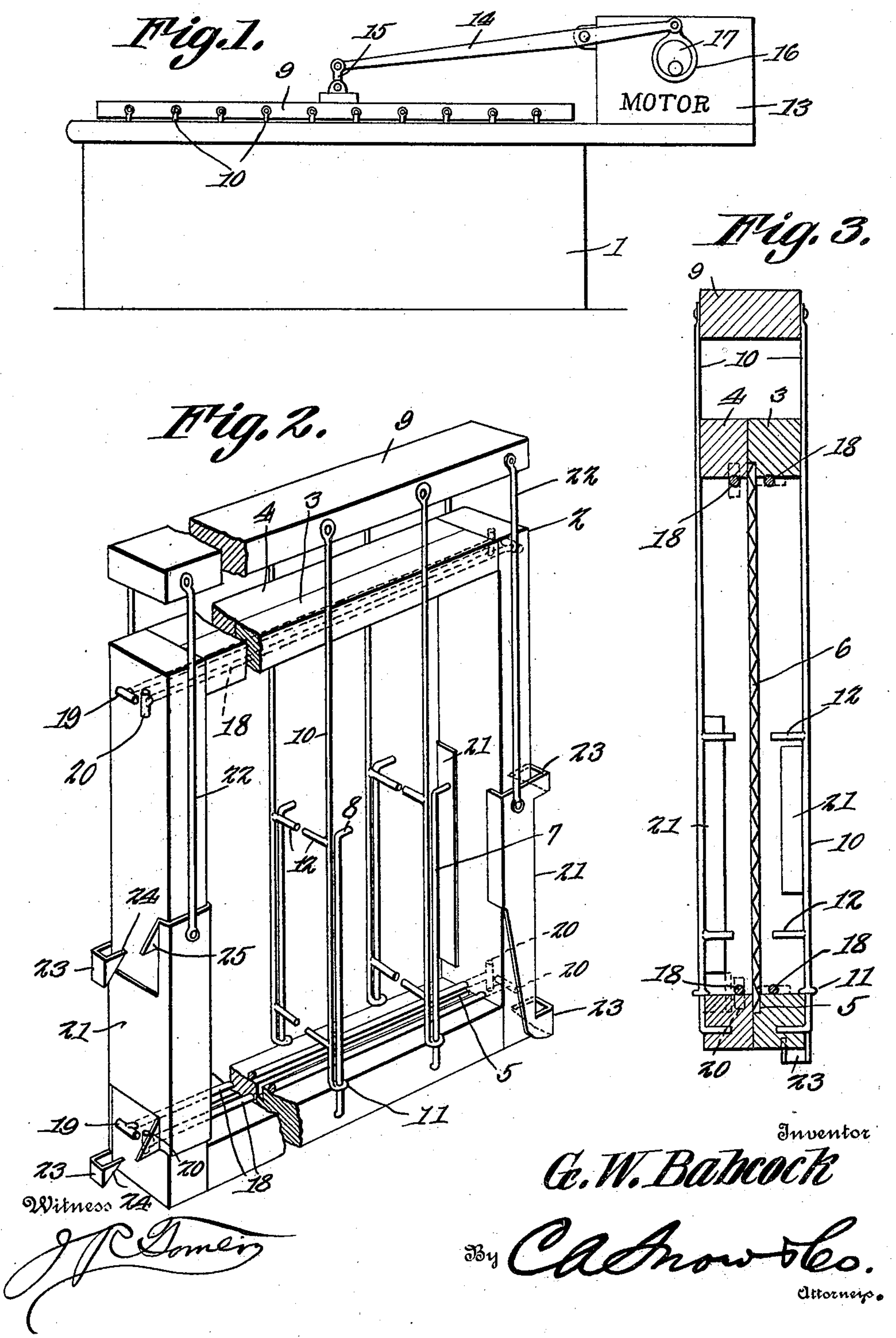
Figure 1 is an elevation of a bee hive having the present improvements combined therewith.
Figure 2 is a perspective view of a portion of one the comb frames and showing the means employed for compelling the bees to work in certain limited areas.
Figure 3 is a vertical transverse section through the structure shown in Figure 2.

Referring to the figures by characters of reference 1 designates a bee hive which can be of any desired construction and this hive is adapted to hold a number of frames 2 for holding the comb honey. Each frame is preferably made up of detachably connected sections 3 and 4 forming a continuous groove 5 therebetween for receiving the marginal portions of the comb formation or midrib 6, as shown particularly in Figure 3. Secured to each of the sections of the frame 2 at one side thereof are parallel guide rods 7 the free ends of which have laterally extended portions 8 constituting stops. These guide rods are so located that when the two sections of the frame 2 are assembled, the rods will be located in pairs, the rods of each pair being disposed at opposite sides of the frame.

Mounted for movement relative to the frame 2 is a cross head 9 to which are connected rods 10 arranged in pairs and which rods are provided, at their free ends, with eyes 11 adapted to slide along the respective guide rods 7. Each of the rods 10 has two or more inwardly extending fingers 12 thereon, the fingers on the rods of each pair extending toward each other and terminating close to but out of contact with the foundation or midrib 6.

It is intended to move the cross head 9 slowly backwardly and forwardly and for this purpose any suitable mechanism may be employed. In Figure 1 a motor has been indicated generally at 15. This motor is adapted to drive a lever 14 which is connected by a link 15 to the middle portion of the cross head 9. Any suitable means may be provided for transmitting motion to the lever from the motor, the means shown in Figure 1 including a link 16 and an eccentric 17. Obviously various other means may be employed, the sole object being to provide mechanism whereby the cross head 9 will be moved upwardly and downwardly very slowly. In practice it has been found desirable to move the cross head 9 at such a speed that it will complete its movement in each direction in about fifteen minutes or, in other words, will require about thirty minutes to pass from its lowest position to its highest position and thence back to its lowest position.

It is a well known fact that bees will not work at any point where they are in any way disturbed. By having the cross head 9 move upwardly and downwardly at a slow speed, the fingers 12 will be given a corresponding movement and will travel close to the midrib. Thus the bees located in the hive will construct their cells upon the midrib or comb foundation but as the bees will be gradually pushed aside by the ascending and descending fingers 12 they will not build their cells in the paths of the fingers but will leave clear spaces or depressions in said paths extending inwardly to the midrib. Consequently after the comb frame 2 has been filled with honey, it can be removed from the hive and by cutting the midrib along the depressions, separated sticks of honey will be obtained, the cells on each stick being completely sealed or capped.

As it is not desirable for the fingers 12 to move close to the top and bottom of the frame because they would thus tend to crush any bees that might be in the paths thereof, some means must be provided for preventing the bees from building the cells onto the top and bottom of the frame and upon the adjacent marginal portion of the comb formation. For this purpose a rod 18 is mounted for rotation close to and at each side of the comb formation at the top and bottom thereof. Each of these rods is provided at its ends with T-heads 19 and 20 respectively, the two heads on each rod lying in planes disposed at right angles to each other.

A slide 21 is mounted on each side bar of the frame 2, these slides being connected to the cross head 9 by rods 22. Each slide works between an upper and a lower pair of heads 19 or 20. Extending laterally from the upper and lower ends of each slide 21 are small yokes 23 each having an inwardly extending tappet or finger 24 designed to move between the T-heads of each pair. Tappets or fingers 25 extend laterally from each end portion of each slide and are located higher than the respective tappets 24. These tappets 25 are adapted to work between the heads and one face of the frame 2. The two slides 21 are oppositely arranged so that the tappets 24 will act upon the heads at one end of two superposed rods while the tappets 25 on the other slide will act upon the heads at the other ends of said rods. Thus it will be seen that when the two slides are reciprocated by the up and down movement of the cross head 9 the tappets will cooperate to rotate each head and its rod intermittently in one direction. For example, during the upward movement of the slides 21 the tappets 24 will come against and swing upwardly the inner ends of the horizontal heads 19 in the paths thereof and, during the return movement of the slides the tappets 25 will engage the heads 20 at the other ends of the rods and swing them downwardly. This intermittent rotation of the rods will be sufficient to prevent the bees from building upon the rods or upon the adjacent portions of the comb formation and the frame. Consequently the comb honey will not extend to the top and bottom of the frame but spaces will be left to permit the comb formation to be severed without fracturing any of the cells of the honeycomb.

Obviously a number of frames can be arranged in each hive and they can all be provided with cross heads 9 which can be caused to move upwardly and downwardly together. It will also be understood that any desired means may be employed for imparting a slow up and down movement to the cross heads.

What is claimed is:—

1. The combination with a frame for comb honey, of members at opposite sides of the frame and extending inwardly toward each other, said members being spaced apart a distance slightly greater than the thickness of a midrib within the frame, and means for reciprocating the members to prevent the formation of cells in the paths thereof.

2. The combination with a frame for comb honey, and parallel guides upon the frame, of opposed members extending inwardly toward each other and mounted upon the guides, said members being spaced apart to receive between them a midrib held by the frame and means for reciprocating the members to prevent the formation of cells in the paths thereof.

3. The combination with a frame for comb honey and guides connected to opposed portions of the frame, of members mounted upon the guides and having inwardly extending portions movable within the frame and spaced apart a distance to receive between them a midrib held by the frame and means for reciprocating the members to prevent the formation of cells in the paths thereof.

4. The combination with a frame for comb honey, of members at opposite sides of the frame and extending inwardly toward each other, said members being spaced apart a distance slightly greater than the thickness of a midrib within the frame, means for reciprocating the members to prevent the formation of cells in the paths thereof, revoluble elements extending across the ends of the paths of said inwardly extending members and close to the midrib and means for intermittently rotating said elements to prevent the building of cells along the adjacent portions of the midrib.

5. The combination with a frame for comb honey, of opposed members extending inwardly toward each other, said members being spaced apart to receive between them a midrib held by the frame, means for reciprocating the members to prevent the formation of cells in the paths thereof, revoluble elements extending across the ends of the paths of said reciprocating members and means for intermittently rotating said elements to prevent the building of cells along the adjacent portions of the midrib.

6. The combination with a frame for comb honey, of opposed members extending inwardly toward each other, said members being spaced apart to receive between them a midrib held by the frame, means for reciprocating said members to prevent the formation of cells in the paths thereof, rods mounted for rotation upon the frame adjacent the ends of the paths of said members and adapted to receive a midrib therebetween, and means for intermittently rotating the rod during the reciprocation of the members.

7. The combination with means for holding a midrib within a hive, of members extending close to the midrib, and means for moving said members to force bees out of the paths thereof and prevent the building of cells in said paths.

8. The hereindescribed step in the method of forming sticks of comb honey which consists in supporting a midrib within a hive and forming depressions in opposed faces of the cake of comb honey formed on the midrib, by moving members which extend close to the midrib and thus prevent the formation of cells in the paths of the members.

9. The hereindescribed method of forming sticks of comb honey which consists in placing a midrib within a hive, operating movable structures constantly along parallel lines at opposite sides of and close to the midrib and along the points of connection between the midrib and its holding means, thereby to confine the working bees to limited areas and leaving the midrib free of cells along parallel lines and along its points of connection with its holding means, and finally severing the midrib along said lines.

10. The hereindescribed method of forming sticks of honey in a hive which consists in providing movable structures at opposite sides of the comb formation and moving said structures along parallel lines at opposite sides of the comb formation in the hive while the bees are at work.

11. The hereindescribed method of forming sticks of comb honey in a hive which consists in providing movable means at opposite sides of a comb formation and then moving said means while the bees are at work thereby to keep the bees from predetermined areas.

In testimony that I claim the foregoing as my own, I have hereto affixed my signature in the presence of two witnesses.

GEORGE W. BABCOCK.

Witnesses:
HARRY N. MARTIN,
FRANK KERSCHER.